Aug. 5, 1952
D. A. COOK
2,606,102
TEST STRIPS FOR DETECTING LOW CONCENTRATIONS OF CHLORINE IN AIR
Filed Dec. 3, 1946
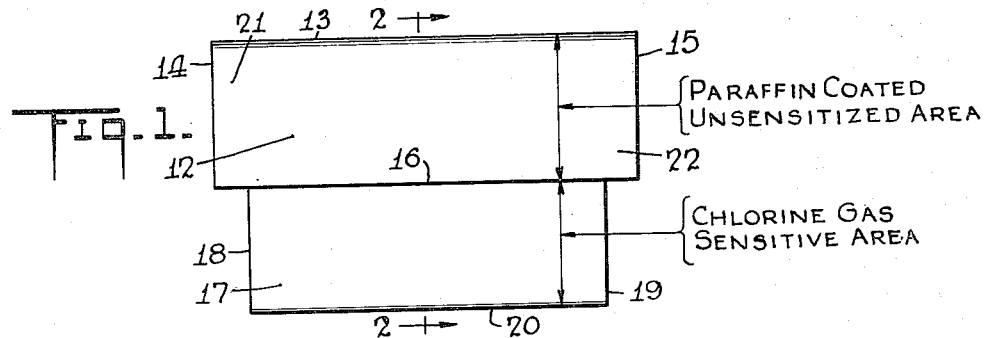
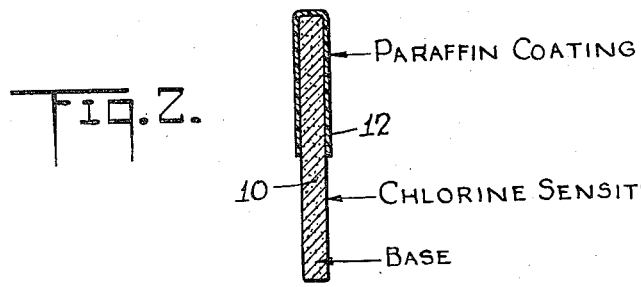
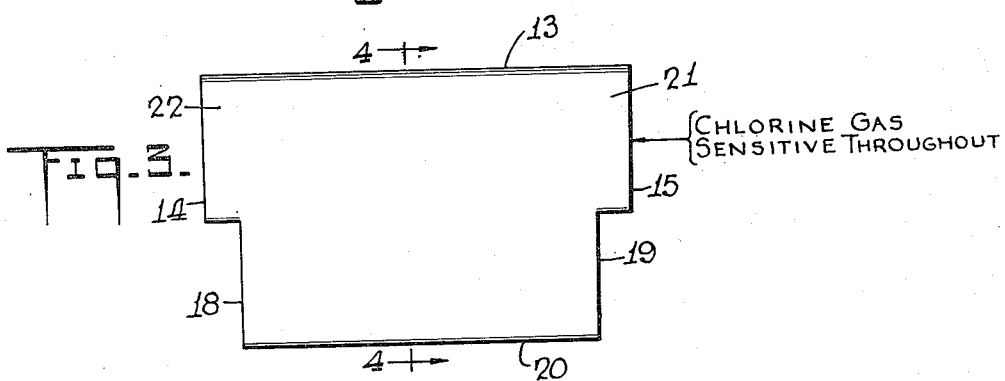
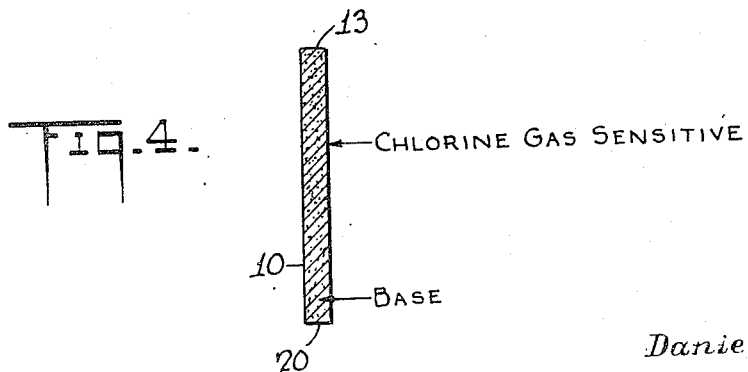
INVENTOR
Daniel A. Cook
BY
Benjamin Sweedler
ATTORNEY Patented Aug. 5, 1952

2,606,102

UNITED STATES PATENT OFFICE 2,606,102

TEST STRIPS FOR DETECTING LOW CONCENTRATIONS OF CHLORINE IN AIR

Daniel A. Cook, Syracuse, N. Y., assignor to Allied Chemical & Dye Corporation, a corporation of New York Application December 3, 1946, Serial No. 713,777

7 Claims. (Cl. 23—254)

This invention relates to a test strip for the detection of low concentrations of chlorine gas in air and more particularly to a reliable test paper sensitive to low concentrations of chlorine gas in air and therefore eminently suitable for use in detecting chlorine gas leaks.

It is extremely important that a chlorine gas leak be detected early, i. e., while the concentration of chlorine gas in the surrounding atmosphere is low. This is evident from Industrial Hygiene Manual, Air Service Command (1943) page 36, which points out that a concentration of chlorine gas in air of one part per million is the maximum amount to which a person can be safely exposed for long periods of time; a concentration of 3.5 parts per million is the lowest concentration having a detectable odor; a concentration of 4 parts per million is the maximum amount to which an individual may be exposed for short periods of time, of the order of from ½ to 1 hour; a concentration of 15.1 parts per million is the least quantity causing immediate irritation to the throat; a concentration of 30.2 parts per million is the least quantity causing coughing; and a concentration of 40 to 60 parts per million or more is dangerous for even short exposures. If a chlorine gas leak is detected promptly upon its formation, it can readily be dealt with since while the concentration of the chlorine gas in air is below 4 parts per million, the chlorine gas is not unduly harmful for the short periods of time required to stop the leak or to dispose of the leaking tank or cylinder. The attendant, once he discovers the leak, immediately positions the tank or cylinder so that chlorine gas rather than liquid escapes, thereby minimizing the build-up of high concentrations of free chlorine in the surrounding atmosphere. From the same size orifice or opening the weight of chlorine issuing as liquid chlorine is about eight times that which would issue if the leak were a gas leak, each at the same cylinder pressure. On the other hand, if the leak remains undetected, the concentration builds up to the point where the chlorine gas in the air exceeds four parts per million, whereupon the attendant is confronted with a major problem which may develop into a serious accident.

The presence of free chlorine gas in air was heretofore detected either by its odor, i. e., by the sense of smell, or by the use of ammonia. The first method is unsatisfactory because different individuals have their senses of smell developed to different extents; furthermore, as noted above, a concentration of less than 3.5 parts per million cannot be detected by the sense of smell. Hence when the concentration approaches this point it is already approaching a dangerous level. The second method is unsatisfactory because it is not sensitive to low concentrations of chlorine gas; ammonia vapor will not readily detect the presence of chlorine gas under a concentration of 400 parts per million. These methods therefore do not lend themselves to early detection of chlorine gas leaks.

It is an object of this invention to provide a test strip for detecting low concentrations (less than 4 and preferably less than 2 parts per million) of chlorine gas in air, which is extremely sensitive and therefore is efficient in operation and which retains its sensitivity for relatively long periods of time, of the order of months, when properly stored. Other objects and advantages of this invention will be apparent from the following detailed description thereof.

In accordance with this invention, an absorbent base such as a fibrous base, preferably white paper free from size, such as filter paper, is treated with a solution of orthotolidine and a hygroscopic substance. The solution preferably also contains an acid which is not volatile under the conditions of use, the amount of acid present being sufficient to maintain the pH of the solution at less than 7.

The hygroscopic substance used should not materially affect the property of orthotolidine or its salts to give a color reaction with chlorine. Glycerine is preferred but other hygroscopic substances compatible with orthotolidine such as calcium chloride solutions or ethylene glycol may be used. As the non-volatile acid, any acid which does not materially affect the property of orthotolidine or its salts to give a color reaction with chlorine and does not materially weaken the absorbent base may be employed. In general non-volatile, weak, non-oxidizing acids such as phosphoric, lactic, tartaric and citric acids are preferred. These acids probably react with the orthotolidine to form salts which are as sensitive to chlorine as the unreacted orthotolidine.

Orthophosphoric acid is particularly preferred because it was found to result in a test paper somewhat more sensitive and permanent than those produced when other acids were used instead of the phosphoric acid. The term orthotolidine is used in the claims in a broad sense to include the salts of orthotolidine formed by reaction of the orthotolidine with the acid incorporated in the impregnating liquid.

The test strip may be made by coating paper such as filter paper or other fibrous material, such as cotton cloth, free of size, into strips of the desired size, for example, approximately 3" x 1". Alternatively a strip of paper, or of other fibrous material of desired width say 1" and of a length sufficient to form a roll thereof, may be impregnated with the solution or suspension hereinbelow described and after drying rolled into a roll for use of sections of the roll as the test strip.

The impregnating liquid is prepared by adding the orthotolidine to a solvent, such as alcohol, stirring until the orthotolidine has dissolved or formed a fine suspension, and adding the hygroscopic agent and the acid while continuing the stirring until all the constituents have been dissolved or form a fine suspension. In making the preferred impregnating solution or suspension, herein referred to as the impregnating liquid, from 1 to 15 grams, preferably 1 to 10 grams, of orthotolidine are added per liter of solvent. Each liter of solvent may contain from about 100 to 200 cc. of glycerine and 800 to 900 cc. of alcohol. The glycerine is a solvent for the orthotolidine and hence serves a dual function; viz. as a solvent and hygroscopic substance. The acid in amount to maintain the pH of the impregnating liquid at less than 7 is then added while stirring until all the constituents have been dissolved or form a fine suspension. One gram of orthophosphoric acid per liter of liquid is sufficient for this purpose.

The impregnating liquid thus prepared should be kept away from bright or direct light and desirably should be used immediately for the impregnation of the test strips. This may be effected by immersing each test strip in the liquid, making certain that the strip is completely submerged. The wet strips are then dried, for example by placing on clean paper towels and left there until they are completely dry or by suspending the impregnated strip or strips in a current of dry air. While drying, they should not be exposed to bright or direct light. When thoroughly dried, the strips should be placed in a stoppered amber bottle or other container which protects them from exposure to harmful light rays.

In a preferred embodiment of the invention only a portion of the surface of the test strip is sensitized as hereinabove described, leaving a contiguous portion unsensitized so that when the sensitized portion is exposed to air containing chlorine gas it changes color which contrasts with the color of the unsensitized portion, especially near or at the line of separation between the sensitized and unsensitized portions so that initial color development is readily recognized. For example, approximately one-half of the test strip may be impregnated with the impregnating liquid, leaving the remainder of the strip unsensitized. Preferably, however, the entire strip is impregnated, for example by immersion in the liquid as hereinabove described and thereafter a portion, say one-half, of the strip coated with a protective material to render the coated portion of the strip non-sensitive to chlorine gas in air. A thin paraffin coating will be found suitable for this purpose, the color of the paraffin coated portion being substantially the same as that of the sensitized portion so that the strip appears to have a uniform color. However, when the strip is exposed to air containing chlorine gas, only the sensitized portion turns blueish green, contrasting with the tint (nearly white) of the protected portion, especially near or at the line of separation between the sensitized and paraffin coated areas. The intensity of the green color increases with increase in time of exposure or with exposure to increasing concentrations of chlorine gas in air.

The protecting coating may be formed by applying a solution of paraffin of 50° to 52° C. melting point, for example in a solvent such as benzol, by dipping the impregnated test strip in such solution or by brushing the coating solution onto the test strip. If the dipping procedure is followed, it will be found the paraffin solution will creep above the line of immersion by capillary action. A few tests will show the proper depth to which the test strip should be immersed to obtain uniform coating of the desired area of the strip. After the strips are dipped they should be stood on edge or suspended with the protected or coated edge down so that no excess paraffin solution will run on to the uncoated sensitized portion of the strips and the strips dried in this position. Since the resultant test strips are extremely sensitive to chlorine, they should be prepared in an atmosphere free of chlorine.

In the accompanying drawing, forming a part of this specification and showing, for purposes of exemplification, preferred forms of this invention without limiting the claimed invention to such illustrative instances.

Figure 1 is a plan view of a test strip embodying this invention and illustrates a preferred embodiment of this invention;

Figure 2 is a vertical section taken in a plane passing through line 2—2 of Figure 1;

Figure 3 is a plan view of a modified form of test strip; and

Figure 4 is a vertical section taken in a plane passing through line 4—4 of Figure 3.

In the drawing 10 indicates a fibrous base, desirably paper free from size, such as filter paper. This paper is immersed in the impregnating liquid or solution hereinabove described and thus impregnated therewith. A protective paraffin coating covers the upper portion 12 of base 10 sealing the top edge 13 and side edges 14, 15. 16 indicates the line of demarcation between the paraffin coated portion 12 and the sensitized lower portion 17 defined by side edges 18, 19 and lower edge 20. Sensitized lower portion 17 is of less width than the upper portion 12 providing side projections or extensions 21, 22 for mounting the test strip in vertical position in the casing through which air collected from the vicinity of the chlorine cylinders or tanks is passed. These extensions may be engaged by suitable clips to maintain the test strip in vertical position.

The modification of Figures 3 and 4 differs from that of Figures 1 and 2 chiefly in that the entire surface of the base is sensitized, i. e., the paraffin coating has been omitted. Like parts of this modification have been given like reference characters and it is believed the composition and structure of this modification will be evident from the above description of Figures 1 and 2.

One example of this invention follows; it will be understood this example is given for illustrative purposes only and the invention is not limited thereto.

1 gram of orthotolidine crystals were dissolved in 75 cc. of ethyl alcohol while stirring until the orthotolidine was dissolved. 15 cc. of glycerine was then added while continuing the stirring and .1 cc. of orthophosphoric acid introduced drop by drop into the solution while stirring. Enough ethyl alcohol was then added to form 100 cc. of solution.

Filter paper was cut into strips approximately 3" x 1" and of the shape shown in the drawing. The strips were immersed in the solution so as to completely submerge each strip. The strips were then dried and then dipped in a paraffin solution in benzol so that portion 12 only was wet by the solution. After dipping the strips were placed on edge 13 and allowed to dry. All of the above was carried out in subdued light, the strips were not exposed to bright or direct light during or after impregnation with the chlorine sensitive solution or during any of the subsequent treatments.

A test strip having an absorbent base impregnated with an impregnating liquid containing orthotolidine, a hygroscopic agent and preferably an acid also, so that the liquid has a pH of less than 7, has been found exceptionally sensitive to small concentrations of chlorine in air and to retain its sensitivity for long periods of time. The sensitivity of such strips, i. e., their ability to promptly detect the presence of small concentrations of chlorine in air may be further improved by having an unsensitized portion contiguous to a sensitized portion, as in Figures 1 and 2, so that color change brought about by the reaction of the chlorine with the chlorine sensitive reagent is more readily apparent due to the contrast between the sensitized and unsensitized portions along the line of demarcation therebetween. The feature of having an unsensitized portion contiguous to a sensitized portion is applicable not only to test strips impregnated with orthotolidine and a hygroscopic agent but also to test strips impregnated with other chlorine sensitive reagents, such, for example, as para-aminodimethylaniline and pyramidone.

Test strips prepared as hereinabove described have been found extremely sensitive to traces of chlorine in air. They will show the presence of chlorine in concentrations as low as 1.7 parts per million. The presence of hygroscopic substances in the solution is important because it prevents the treated strips from drying too much. It has been found that a moist strip is more sensitive to the presence of chlorine gas in air. It has been further found that the test strip retains unimpaired sensitivity for long periods of time, of the order of months, if the impregnating solution has a pH of less than 7. Test strips which have a pH of greater than 7 turn brown after a few days and lose their sensitivity whereas strips made in accordance with his invention and properly stored, e. g., in stoppered amber colored bottles, so that they are protected against harmful light rays have retained their sensitivity for at least ten months.

Since certain changes may be made in the above product and different embodiments of the invention could be made without departing from the scope thereof, it is intended that all matter contained in the above description or shown in the accompanying drawing shall be interpreted as illustrative and not in a limiting sense.

What is claimed is:

1. A test strip for detecting low concentrations of chlorine in air, comprising a fibrous base having a portion sensitive to low concentrations of chlorine in air, the sensitized portion containing orthotolidine, a liquid hygroscopic material in which orthotolidine is soluble and a weak non-oxidizing acid substantially non-volatile at atmospheric temperatures and pressure, which acid does not affect the property of orthotolidine to give a color reaction with chlorine and does not materially weaken the fibrous base, said acid being present in an amount sufficient to maintain the said sensitized portion at a pH of less than 7.

2. A test strip for detecting low concentrations of chlorine in air comprising paper having a portion sensitive to low concentrations of chlorine in air, the sensitized portion containing orthotolidine, glycerine, and orthophosphoric acid.

3. A test paper for detecting low concentrations of chlorine in air comprising a white paper free of size impregnated with a solution containing orthotolidine, glycerine and orthophosphoric acid.

4. A test strip for detecting low concentrations of chlorine in air comprising a fibrous base having one portion not sensitive to traces of chlorine and a contiguous portion sensitive to traces of chlorine, the sensitized portion being impregnated with an impregnating liquid containing orthotolidine, a solvent for the orthotolidine, a liquid hygroscopic agent in which orthotolidine is soluble and a weak, non-oxidizing acid substantially non-volatile at atmospheric temperatures and pressure, which does not affect the property of orthotolidine to give a color reaction with chlorine and does not materially weaken the fibrous base, said acid being present in amount sufficient to maintain the pH of the liquid at less than 7.

5. A test paper for detecting low concentrations of chlorine in air, said paper having one marginal portion thereof coated with paraffin so that it is not sensitive to chlorine and having the remainder of the surface thereof sensitive to low concentrations in air, the sensitive portion containing orthotolidine, glycerine and orthophosphoric acid, whereby upon exposure of said test paper to chlorine gas the sensitized portion turns color which contrasts with the color of the paraffin coated portion.

6. A test strip for detecting low concentrations of chlorine in air comprising an absorbent base containing orthotolidine, a liquid hygroscopic material in which orthotolidine is soluble and a weak, non-oxidizing acid substantially non-volatile at atmospheric temperatures and pressure, which does not affect the property of orthotolidine to give a color reaction with chlorine and does not materially weaken the absorbent base, said acid being present in an amount sufficient to maintain said absorbent base at a pH of less than 7.

7. A test strip for detecting low concentrations of chlorine in air comprising paper impregnated with a solution containing orthotolidine, from 10 to 20 cc. of glycerin per gram of orthotolidine and a weak, non-oxidizing acid substantially non-volatile at atmospheric temperatures and pressure, which does not affect the property of orthotolidine to give a color reaction with chlorine and does not materially weaken the paper, said acid being present in amount sufficient to impart to said solution a pH of less than 7.

DANIEL A. COOK.

REFERENCES CITED

The following references are of record in the file of this patent:

UNITED STATES PATENTS

| Number | Name | Date |
|---|---|---|
| 1,740,462 | Hutton | Dec. 24, 1929 |
| 1,843,234 | Karnes et al. | Feb. 2, 1932 |
| 1,986,403 | Lehmkuhl | Jan. 1, 1935 |
| 2,113,063 | Stryker et al. | Apr. 5, 1938 |
| 2,151,984 | Moyle et al. | Mar. 28, 1939 |
| 2,176,462 | McAllister | Oct. 17, 1939 |
| 2,178,550 | Acree | Nov. 7, 1939 |
| 2,232,622 | Moses | Feb. 18, 1941 |
| 2,234,499 | McAllister | Mar. 11, 1941 |
| 2,249,867 | Snelling | July 22, 1941 |
| 2,290,436 | Kamlet | July 21, 1942 |
| 2,314,336 | Goodale | Mar. 23, 1943 |
| 2,385,471 | Scharer | Sept. 25, 1945 |

OTHER REFERENCES

Cohn: "Indicators and Test Papers," page 192 (1899), Wiley & Sons.

Ellms and Hanser: "J. Ind. and Eng. Chem.," vol. 5, No. 11, pages 915–917 (1913).

Kolthoff and Rosenblum: "Acid Base Indicators," page 362, paragraph 2 (a). (1937) MacMillan Co., N. Y. C.

Altieri: "Gas Analysis and Testing of Gaseous Materials," page 277 (1945), American Gas Association, N. Y. C.

Dragt et al.: "Solutions for Colorimetric Standards," Ind. and Eng. Chem., anal. ed., vol. 10 No. 5, pages 256–258, May 15, 1938.